United States Patent [19]

Nishi et al.

[11] Patent Number: 5,326,955
[45] Date of Patent: Jul. 5, 1994

[54] STANDOFF CONTROL METHOD AND APPARATUS FOR PLASMA CUTTING MACHINE

[75] Inventors: Yozo Nishi, Komatsu; Eiichi Nozaki; Masahiko Hasegawa, both of Hiratsuka; Iwao Kurkawa, Yokohama; Atsushi Wakui, Naka, all of Japan

[73] Assignee: Kabushiki Kaisha Komatsu Seisakusho, Tokyo, Japan

[21] Appl. No.: 941,087

[22] PCT Filed: Apr. 17, 1991

[86] PCT No.: PCT/JP91/00514

§ 371 Date: Oct. 19, 1992

§ 102(e) Date: Oct. 19, 1992

[87] PCT Pub. No.: WO91/16170

PCT Pub. Date: Oct. 31, 1991

[30] Foreign Application Priority Data

Apr. 17, 1990 [JP] Japan .................................. 2-102329
Apr. 17, 1990 [JP] Japan .................................. 2-102330
Apr. 17, 1990 [JP] Japan .................................. 2-102656

[51] Int. Cl.⁵ .................. B23K 10/00; B23K 9/073
[52] U.S. Cl. .................. 219/121.56; 219/124.03; 219/121.54; 219/121.39; 219/121.44; 219/121.57
[58] Field of Search .................. 219/121.39, 121.38, 219/121.59, 121.54, 121.56, 121.57, 121.44, 74, 75, 124.01, 124.03, 130.4

[56] References Cited

U.S. PATENT DOCUMENTS

| 4,156,125 | 5/1979 | Brown | 219/124.03 |
| 4,170,727 | 10/1979 | Wilkins | 219/124.03 |
| 4,477,713 | 10/1984 | Cook et al. | 219/124.34 |
| 4,544,825 | 10/1985 | Cook | 219/124.22 |
| 4,766,286 | 8/1988 | Iceland | 219/121.57 |
| 4,897,521 | 1/1990 | Burr | 219/124.03 |

FOREIGN PATENT DOCUMENTS

| 57-44469 | 3/1982 | Japan . |
| 57-195582 | 12/1982 | Japan . |
| 60-43831 | 9/1985 | Japan . |
| 62-24864 | 2/1987 | Japan . |
| 62-127173 | 6/1987 | Japan . |

Primary Examiner—Mark H. Paschall
Attorney, Agent, or Firm—Richards, Medlock & Andrews

[57] ABSTRACT

The present invention discloses a standoff control method and an apparatus for a plasma cutting machine capable of quickly correcting a deviation of the standoff with respect to a set value, keeping constant the standoff even if the cutting speed changes, preventing deterioration of the working efficiency even if a double-arc is generated, and properly detecting the use limit of the electrode. Standoff correction computing device (28) includes a reference voltage computation setter (36) for outputting a reference voltage between a workpiece to be cut and an electrode or a nozzle with respect to a predetermined standoff, an error computing device (37) for calculating the deviation of said detected voltage with respect to the reference voltage, and a correction quantity computing device (38) for outputting a vertical repositioning speed signal for the torch in accordance with the degree of the deviation. An electrode consumption/standoff detector (34) can be provided which outputs, to the error computing device (37) a standoff signal which is obtained by correcting for the degree of rise of the voltage which has taken place due to the consumption of the electrode (12).

13 Claims, 8 Drawing Sheets

| THICKNESS FACTOR | | NOZZLE FACTOR | | STANDOFF | | SPEED FACTOR | |
|---|---|---|---|---|---|---|---|
| THICKNESS FACTOR | $K_t$ | NOZZLE DIAMETER | $K_N$ | $K_{S1}$ | 10.5 | $K_{V1}$ | 3.1 |
| 0.5 | 1.2 | 0.3 | 0.7 | $K_{S2}$ | 7.1 | $K_{V2}$ | 2.0 |
| 1 | 1 | 0.4 | 0.85 | | | | |
| 1.5 | 0.85 | 0.5 | 1 | | | | |
| 2 | 0.73 | 0.6 | 1.2 | | | | |
| 3 | 0.60 | ⋮ | ⋮ | | | | |
| ⋮ | ⋮ | | | | | | |

$K_{S1}$: ARC VOLTAGE WHEN STANDOFF IS 1.5mm $K_{S2}$: ARC VOLTAGE CHANGE QUANTITY WHEN STANDOFF IS CHANGED BY 1mm (STEEL / STAINLESS STEEL / ALUMINUM)

STANDOFF CONTROL METHOD AND APPARATUS FOR PLASMA CUTTING MACHINE

TECHNICAL FIELD

The present invention relates to a standoff control method and an apparatus for controlling the standoff between a torch of a plasma cutting machine and a workpiece to be cut, the plasma cutting machine being arranged to cut the workpiece by generating a plasma arc between an electrode thereof and the workpiece.

BACKGROUND ART

A plasma cutting machine has a nozzle disposed to surround an electrode thereof so as to form a fluid passage for an operation gas and throttle a plasma generated in front of the leading portion of the electrode between the electrode and the workpiece to be cut so that the temperature of the plasma is raised and the size of the plasma arc is made to be uniform for the purpose of obtaining an excellent cut surface. However, if the distance between the torch composed of the electrode and the nozzle and the workpiece to be cut is changed, the plasma arc cannot be maintained or an excellent cut shape cannot be obtained because the size of the plasma arc is changed. Hence, the plasma cutting machine has been arranged in such a manner that the distance (hereinafter called a "standoff") between the torch and the workpiece to be cut is kept constant so that the cutting work is performed satisfactorily.

In a case where the standoff is controlled, it has been known that the arc voltage between the workpiece to be cut and the electrode or the nozzle has a proportional relationship with the standoff. The relationship can be utilized to detect the arc voltage, and the detected arc voltage is maintained at a constant value (refer to Japanese Patent Laid-Open No. 57-195582 for example).

However, the aforesaid conventional method is arranged in such a manner that the quantity of the displacement of the torch is simply changed in accordance with the level of the deviation between the detected arc voltage and a reference voltage. Therefore, if the deviation is excessively large, it takes excessive time to realize a predetermined standoff, causing a delay of response to take place. As a result, a satisfactory cutting accuracy cannot be obtained. The aforesaid method is arranged in such a manner that, if the deviation has become excessively large, an abnormal voltage detection circuit disposed individually from a circuit for controlling the standoff detects it so as to turn off the arc voltage. Therefore, the efficiency of the cutting operation deteriorates. What is worse, if the deviation becomes excessively toward negative values, the torch is moved downwardly and the arc is turned off by the abnormal voltage detection circuit so that the deviation is converted into positive values. Hence, the continuation of the downward movement of the torch will cause the torch to collide with the workpiece to be cut, and therefore there is a risk that the torch or the workpiece to be cut is damaged.

Furthermore, consideration has not been taken against the change in the arc voltage with respect to a rise in the arc voltage or a change in the cutting speed due to the consumption of the electrode. As a result, the quantity of the standoff is changed due to the consumption of the electrode or a change in the cutting speed. Therefore, an excellent cutting operation cannot be performed.

In another case in which rebounds of molten metal adhere to a portion adjacent to the nozzle after the torch has approached the workpiece to be cut, or in another case in which the gas flow is disordered due to deformation of the nozzle, a double-arc takes place, for example, between the workpiece to be cut and the nozzle. Hence, the nozzle can be damaged, causing the cutting work to be interrupted. Therefore, an apparatus has been suggested (refer to, for example, Japanese Patent Publication No. 60-43831) which is arranged in such a manner that attention has been paid to the fact that the output voltage from the power source for generating the plasma arc is reduced when the torch comes closer to the workpiece to be cut than a predetermined distance and when the impedance has been reduced, and the output from the power source is shut off if the aforesaid output voltage becomes lower than a reference voltage, so that the torch is protected. However, the cutting operation is temporarily stopped and the working efficiency deteriorates because a command signal, to cause the output from the power source for generating the plasma arc to be zero, is outputted at the time of the generation of the double-arc.

Another method and apparatus has been known (refer to, for example, Japanese Patent Laid-Open No. 62-24864) which detects the use limit of the electrode in accordance with the change of the arc electric current, which is generated between the electrode and the workpiece to be cut, and the voltage. However, since the use limit is detected in accordance with the changes of the waveforms of the electric current and the voltage at the time of the use limit of the electrode, it can be detected after the electrode has been damaged. Therefore, the workpiece to be cut is wasted and the nozzle is damaged. Furthermore, the aforesaid method arranged to detect the use limit in accordance with the voltage cannot easily be put into practical use because the voltage value changes when the cutting conditions are changed.

In order to overcome the aforesaid problems experienced with the conventional technology, an object of the present invention is to provide a standoff control method and an apparatus for a plasma cutting machine capable of quickly correcting deviation of standoff from a set value, capable of keeping constant standoff even if the cutting speed changes, capable of preventing the drop of working efficiency even at the time of occurrence of double-arc and capable of accurately detecting the use limit of an electrode even if the cutting conditions change.

SUMMARY OF THE INVENTION

A first embodiment of the present invention provides a standoff control method for a plasma cutting machine in which the voltage between a workpiece to be cut and an electrode or a nozzle and a workpiece to be cut is detected so as to calculate a deviation from a reference voltage for the purpose of increasing the vertical repositioning speed of the torch in accordance with the calculated deviation. The standoff control method for a plasma cutting machine is arranged in such a manner that the vertical repositioning speed of the torch is made to be zero (0) when the deviation, with respect to the reference voltage, of the voltage between the workpiece to be cut and one of the electrode or the nozzle surrounding the electrode is included in a predetermined first value range. Furthermore, if the deviation has exceeded the first value, the vertical repositioning speed of the torch is linearly increased. If the deviation is larger than a predetermined second value, the vertical repositioning speed of the torch is linearly increased at a higher rate. If the deviation has exceeded a predetermined third value, the torch is moved upwardly at a still higher speed.

As a result of the structure thus arranged, the torch can be quickly moved to a predetermined standoff position so that the workpiece can be cut satisfactorily and accurately. If the deviation is included within a predetermined first value range, the vertical repositioning of the torch is inhibited so that the cutting accuracy is further improved. That is, if a slight change of the standoff is adjusted, the torch can always be vertically repositioning, causing the cut surface to become excessively rough. Hence, the cutting operation cannot be performed satisfactorily. Therefore, in a case where the change of the standoff is included within a predetermined range, that is, if the deviation is included within a predetermined range (non-sensitive zone), the adjustment of the standoff is not performed, so as to obtain an excellent cut surface shape- If the deviation has exceeded the non-sensitive zone, the vertical repositioning speed of the torch is increased in proportion to the degree of the deviation so that the torch is quickly repositioned to a predetermined standoff position. If the deviation has exceeded a predetermined second value, the proportional factor by which the vertical repositioning speed of the torch is made to be in proportion to the deviation is further enlarged so as to as quickly as possible position the torch at a predetermined standoff position for the purpose of satisfactorily performing the cutting operation. Furthermore, the overshooting of the torch 10 can be prevented because the vertical repositioning speed of the torch 10 is lowered in proportion to the deviation. If the deviation has exceeded a predetermined third value, the torch is moved upwardly at a high speed depending upon a determination that the plasma cutting machine has encountered an abnormal accident, so that the problem that the torch comes in contact with the workpiece to be cut is prevented.

A second embodiment of the invention provides a standoff control device for a plasma cutting machine having a standoff correction computing device which includes a reference voltage computing setter for outputting a reference voltage between a workpiece to be cut and one of an electrode and the nozzle with respect to a predetermined standoff, an error computing device for calculating the deviation between the detected voltage and the aforesaid reference voltage, and a correction quantity computing device for outputting a torch vertical repositioning speed signal in accordance with the degree of the aforesaid deviation. The standoff correction computing device includes an electrode consumption/standoff detector which receives the aforesaid detected voltage so as to output, to the error computing device, a standoff signal obtained by correcting for the degree of rise of the voltage which has taken place due to the consumption of the electrode. Furthermore, the reference voltage computation setter outputs, as the reference voltage, a voltage obtained by adding the degree of the change of the arc voltage which has taken place due to the deviation of the cutting speed from the reference cutting speed, to the arc voltage with respect to a predetermined standoff. The aforesaid reference voltage computation setter can receive the aforesaid detected voltage and output the supplied detected voltage as the reference voltage when the torch has been positioned at a predetermined standoff position and the cutting operation has been commenced.

As a result of the structure thus arranged, the electrode consumption/standoff detector subtracts from the detected voltage the amount of the rise in the arc voltage which has taken place due to the consumption of the electrode. Therefore, the change of the standoff due to the consumption of the electrode can be prevented. Since the reference voltage computation setter outputs the reference voltage obtained by adding the change of the arc voltage, which has taken place due to the change of the cutting speed, the standoff of the torch can be kept constant even if the cutting speed changes. Hence, the cutting accuracy can be improved. By setting the reference voltage made by the reference voltage computation setter to be the arc voltage to be generated when the torch is set to the standoff position and the cutting operation is commenced, the influence of the consumption of the electrode can be eliminated and the reference voltage can easily be set.

A third embodiment of the invention provides a standoff control method for a plasma cutting machine arranged in such a manner that a drop of the arc voltage between a workpiece to be cut and a torch is detected, and if generation of a double-arc is detected, the operation is continued by a safety control in which the torch is positioned away from the workpiece to be cut by a predetermined quantity until the double-arc disappears. After the double-arc has disappeared, the aforesaid safety control is quickly cancelled so as to restore the control to a normal torch control. The operation can then be continued by a safety control in which the torch is positioned away from the workpiece to be cut and the cutting speed of the torch is lowered.

As a result of the structure thus arranged, the working efficiency cannot deteriorate even if the double-arc is generated and the operation can be continued by a safety control. Since the machining performance deteriorates when the torch is moved away from the workpiece to be cut because the current density of the plasma arc is lowered, the deterioration of the machining performance by lowering the machining speed of the torch can be prevented.

A fourth embodiment of the invention provides a standoff control method for a plasma cutting machine, wherein the use limit of the electrode is detected from the electrode consumption component voltage obtained when the arc voltage between the electrode and the workpiece to be cut and the arc voltage between the nozzle and the workpiece to be cut are measured so as to calculate, from the measured voltages, an electrode consumption component voltage and a standoff voltage component voltage from which the influence of the consumption of the electrode has been eliminated so as to control the standoff in such a manner that the standoff voltage component voltage becomes substantially constant. Furthermore, another arrangement can be employed in which the standoff is controlled in such a manner that the aforesaid the standoff voltage component voltage becomes substantially constant, the arc voltage at this time is measured, a factor corresponding to cutting conditions such as the thickness, the nozzle diameter and the cutting speed is used to calculate the arc voltage with respect to the reference cutting speed, the aforesaid calculated result and the measured value are subjected to a comparison, and generation of a predetermined difference is detected so as to be the use limit of the electrode.

As a result of the structure thus arranged, the degree of the consumption of the electrode can be always and continuously measured, and the state of progress of the operation and the state of the electrode consumption can be contrasted. Therefore, the time at which the electrode must be changed can be detected even if the operation conditions change.

BEST MODE FOR CARRYING OUT THE INVENTION

A standoff control method and apparatus for a plasma cutting machine according to first and second embodiments of the invention will now be described in detail with reference to the drawings.

Figure 2:
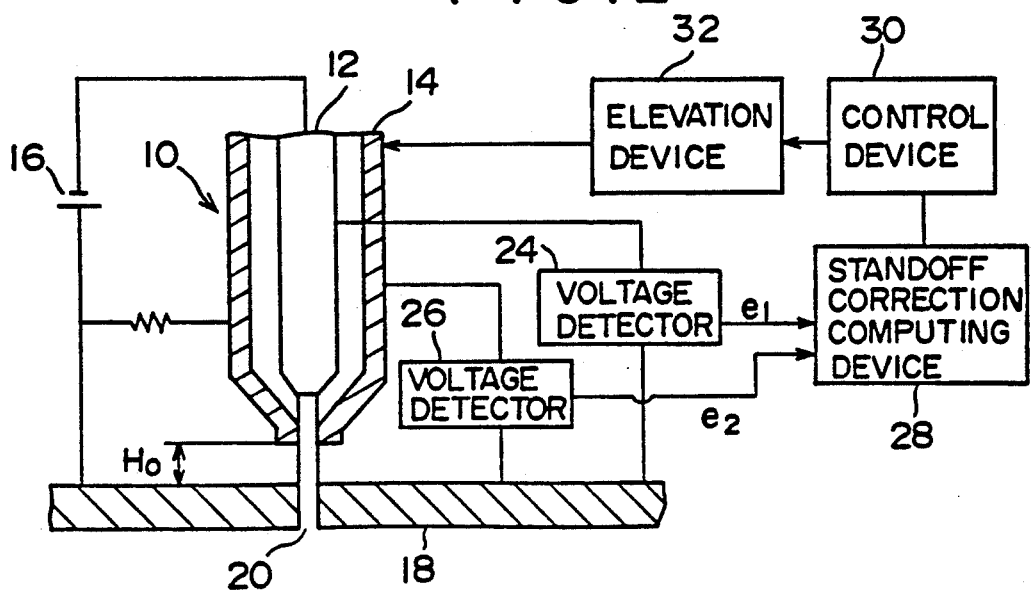
FIG. 2 is a block diagram which illustrates a plasma cutting machine according to a second embodiment of the invention.

FIG. 2 is a block diagram which illustrates the plasma cutting machine, wherein a torch 10 of the transfer-arc-type plasma cutting machine has a nozzle 14 disposed to surround an electrode 12 thereof, the nozzle 14 forming a fluid passage (omitted from illustration) for an operation gas. The electrode 12 is electrically connected to the nozzle 14 and a workpiece 18 to be cut via a DC power source 16 so that a pilot arc is generated between the electrode 12 and the nozzle 14 as well as a main plasma arc 20 between the electrode 12 and the workpiece 18 to be cut. On the other hand, the lower portion of the nozzle 14 is contracted so as to throttle the plasma arc 20 in order to obtain a hot temperature plasma.

The electrode 12, the nozzle 14 and the workpiece 18 to be cut are respectively connected to voltage detectors 24 and 26. The voltage detector 24 detects the voltage between the electrode 12 and the workpiece 18 to be cut so as to supply detected voltage e1 to a standoff correction computing device 28 to be described later. The residual voltage detector 26 detects the voltage between the nozzle 14 and the workpiece 18 to be cut so as to supply detected voltage e2 to the standoff correction computing device 28.

The standoff correction computing device 28 calculates the direction and speed of the vertical repositioning and the quantity of the elevation of the torch in accordance with supplied detected voltages e1 and e2 so as to supply the results to a control device 30 which is connected to the output side of the standoff correction computing device 28. The control device 30 drives a lifting device 32 in accordance with a quantity to be controlled supplied from the standoff correction computing device 28 so as to elevate the torch 10 in such a manner that the standoff between the torch 10 and the workpiece 18 to be cut becomes target standoff H0.

Figure 3:
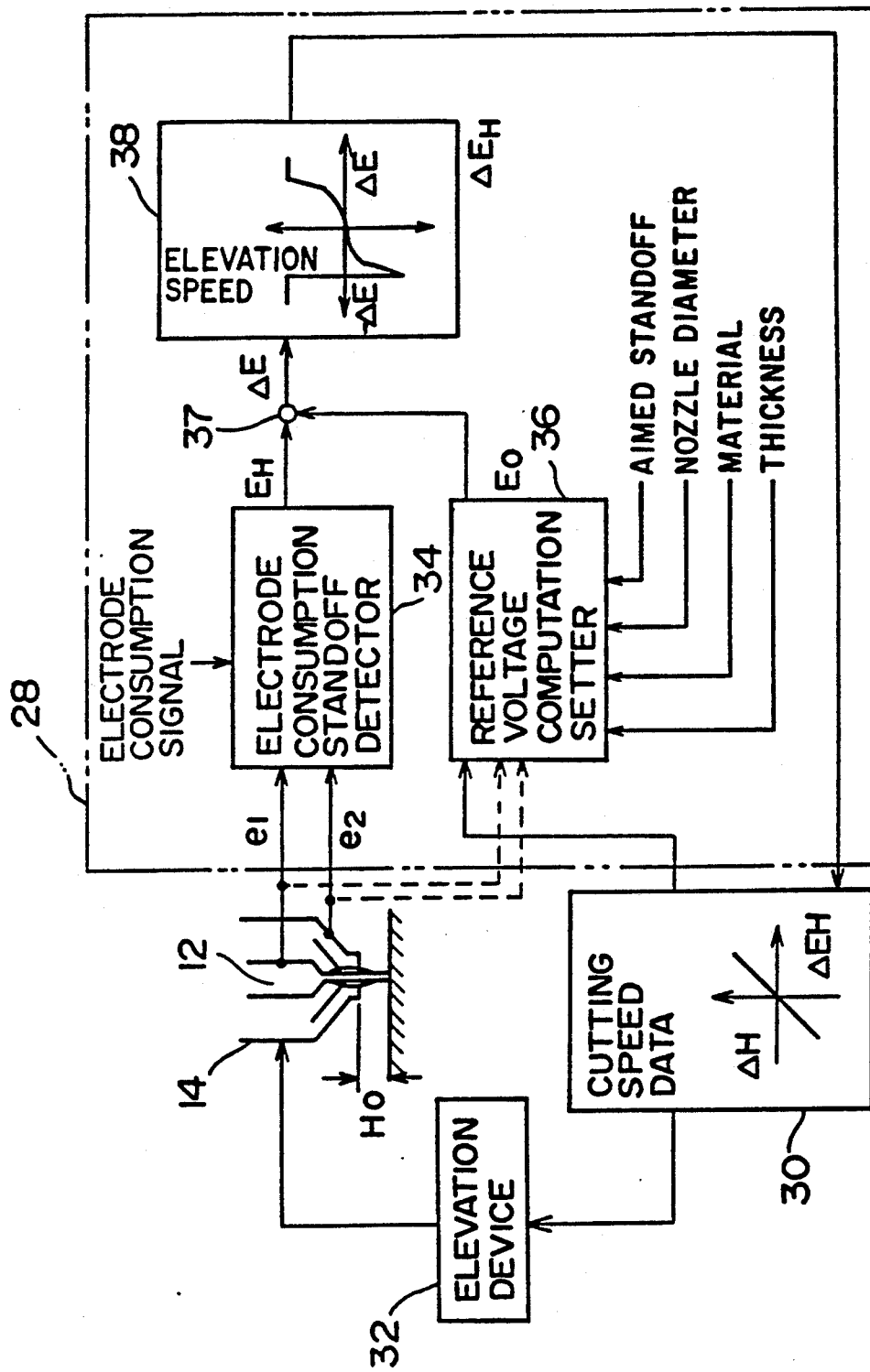
FIG. 3 is a view which illustrates the detailed structure of the standoff correction computing device shown in FIG. 2.

The standoff correction computing device 28, as shown in FIG. 3, comprises an electrode consumption/standoff detector 34, a reference voltage computation setter 36, an error computing device 37 to which signals from them are supplied, and a correction quantity computing device 38 for calculating a correction quantity, with which the torch 10 is elevated, in accordance with an error outputted from the error computing device 37.

The electrode consumption/standoff detector 34 receives detected voltages e1 and e2 outputted from the voltage detectors 24 and 26 so as to calculate the consumption quantity of the electrode 12, the electrode consumption/standoff detector 34 outputting an electrode consumption signal, which corresponds to the consumption quantity, to a display device (omitted from illustration). Furthermore, the electrode consumption/standoff detector 34 calculates actual standoff H and outputs standoff signal which denotes it, to the error computing device 37. The reference voltage computation setter 36 outputs, to the error computing device 37, reference voltage signal E0 which denotes data about the thickness and the material of the workpiece 18 to be cut, the nozzle diameter, the target standoff H0, and the cutting speed.

Figure 1:
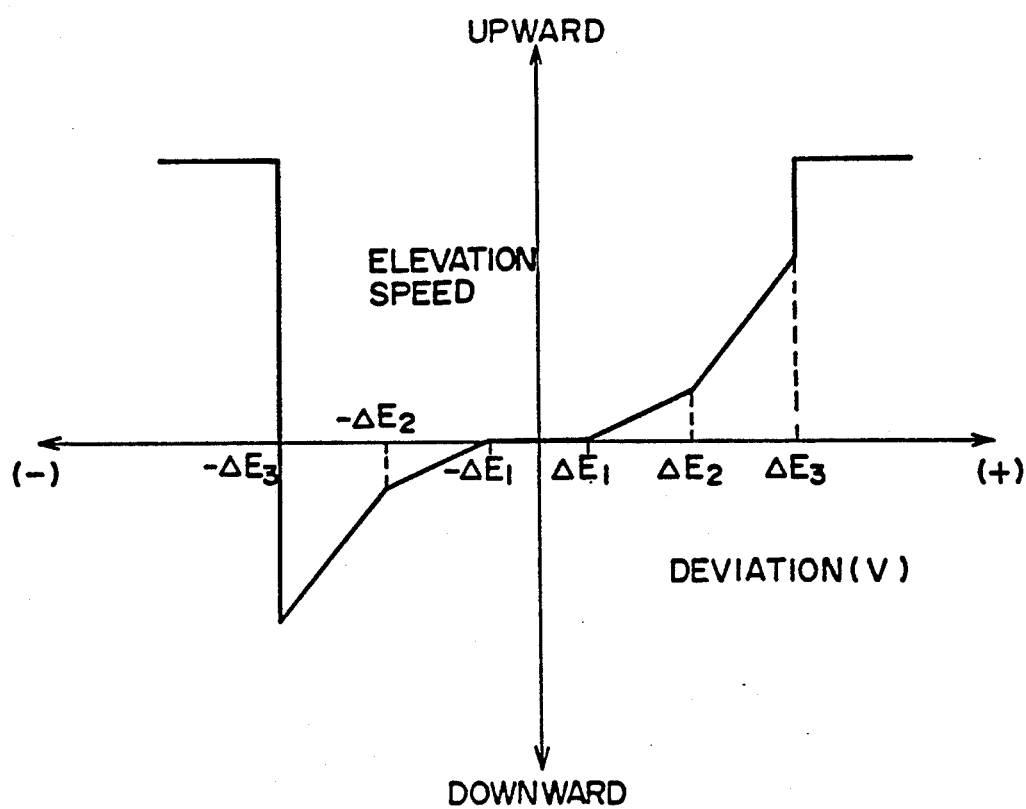
FIG. 1 is a graph which illustrates the relationship between a deviation and the vertical repositioning speed of a torch according to a first embodiment invention.

The correction quantity computing device 38 stares a graph, as shown in FIG. 1, so as to output correction voltage signal ΔEH, the level of which corresponds to deviation ΔE, to the control device 30 for the purpose of returning the torch 10 to the target standoff H0 in accordance with the deviation ΔE with respect to the reference voltage E0 of the standoff signal EH outputted from the error computing device 37. That is, the graph stored by the correction quantity computing device 38 does not output the correction signal if the deviation is included in a predetermined first deviation range ± ΔE1. If the deviation ΔE is between + ΔE1 and + ΔE2, correction voltage signal ΔEH, with which the rising speed of the torch 10 is raised in proportion to the deviation, is outputted. If the deviation ΔE is between −ΔE1 and −ΔE2, correction voltage signal −ΔEH, with which the lowering speed of the torch 10 is raised in proportion to the deviation, is outputted. If the deviation ΔE exceeds the second value ± ΔE2, correction voltage signal ΔEH, with which the ratio of the rising or lowering speed of the torch 10 corresponding to the deviation is further enlarged, is outputted. If the deviation ΔE exceeds a predetermined third value ± ΔE3, a determination is made that the apparatus has encountered abnormality and therefore the torch 10 is rapidly moved upwardly.

Figures 4, 5:
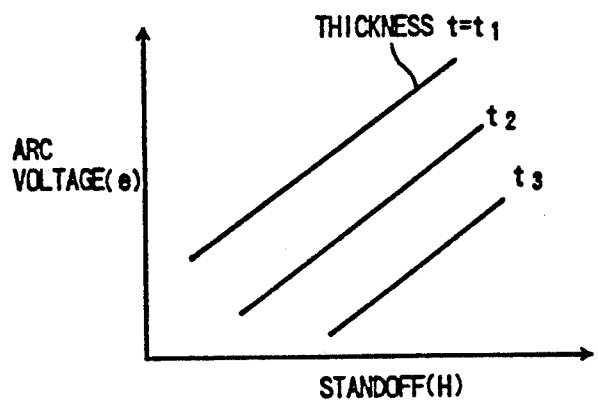
FIG. 4 is a graph which illustrates the relationship between standoff and arc voltage.
FIG. 5 is a view which illustrates an example of a table with which the reference voltage computation setter shown in FIG. 3 calculates the voltage.

The standoff of the plasma cutting machine, thus structured, is controlled as follows: The arc voltage is changed in proportion to the value of the standoff. The target standoff is determined in accordance with the thickness and the material of the workpiece 18 to be cut, the diameter of the nozzle 14, and the cutting speed. Therefore, the reference voltage computation setter 36 of the standoff correction computing device 28 calculates arc voltage e0 with respect to reference cutting speed V0 (assumed to be 1 m/s) in accordance with the following Equation (1) when the thickness and the material of the workpiece 18 to be cut, the target standoff H0 and the like are supplied from a keyboard or a control panel (omitted from illustration):

$$e0 = \{KS1 + KS2 (H0 + Kt)\} \times KN \quad (1)$$

where Ks1, Ks2, Kt and KN are factors obtainable from experiments in accordance with the thickness and the material of the workpiece 18 to be cut and the like, the aforesaid factors being previously stored by the correction quantity computing device 38 as a table arranged as shown in FIG. 5.

Incidentally, the reference voltage computation setter 36 can be arranged in such a manner that the arc voltage corresponding to the standoff, which is determined in accordance with the values of the thickness and the material of the workpiece 18 to be cut, the nozzle diameter, and the cutting speed, is stored therein as graphs arranged as shown in FIG. 4 and, when the conditions, such as the thickness and the material, for cutting the workpiece 18 are supplied from the control panel or the like, a graph which corresponds to the supplied values is selected so as to output the reference voltage E0 which is determined in accordance with the supplied target standoff H0.

The control device 30 has been previously supplied with a cutting program to determine the shape of cutting the workpiece 18 and the cutting speed so as to cause the lifting device 32 to move the torch 10 downwardly to a position at which the arc voltage between the electrode 12 and the workpiece 18 to be cut is e0. Then, the cutting operation is commenced.

When the cutting operation has been commenced, the voltage detectors 24 and 26 respectively obtain the detected voltage e1 between the electrode 12 and the workpiece 18 and e2 between the torch 10 and the workpiece 18 to be cut at predetermined intervals so as to supply them to the electrode consumption/standoff detector 34 of the standoff correction computing device 28.

Figure 6:
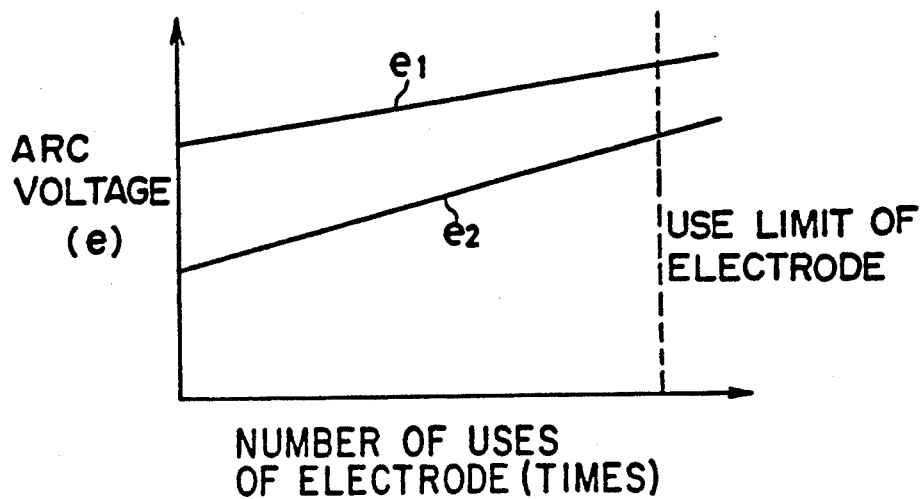
FIG. 6 is a graph which illustrates the relationship between the number of uses of an electrode and the arc voltage.

Even if the target standoff He is kept constant, the aforesaid arc voltages e1 and e2 change, as shown in FIG. 6, due to the consumption of the electrode 12. Therefore, the electrode consumption/standoff detector 34 calculates the electrode consumption component Ep from the following Equation (2) and the standoff component Es, from Equation (3) so as to calculate the consumption quantity of the electrode 12 from the aforesaid equations for the purpose of outputting an electrode consumption signal corresponding to the consumption quantity to a display device or the like (omitted from illustration) so that it is displayed:

$$Ep = ae1 + be2 \quad (2)$$

$$Es = a1e1 + b1e2 \quad (3)$$

Then, the electrode consumption/standoff detector 34 outputs, to the error computing device 37, the standoff signal EH obtained by subtracting from the detected voltage e1 the amount of the rise in the arc voltage which is due to the consumption of the electrode 12 shown in FIG. 6.

When the torch 10 starts cutting, the cutting speed V detected by a cutting speed sensor (omitted from illustration) or cutting speed data (cutting speed V) from the control device 30 is supplied to the reference voltage computation setter 36. The reference voltage computation setter 36 corrects the arc voltage e0 in accordance with the supplied cutting speed V so as to output the reference voltage E0.

Figure 7:
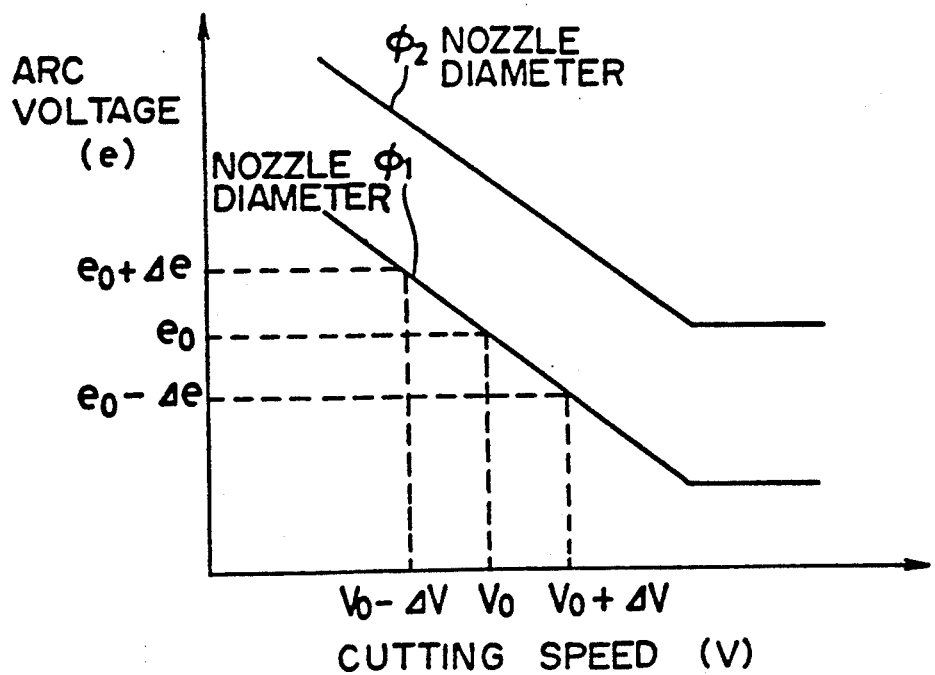
FIG. 7 is a graph which illustrates the relationship between the cutting speed and the arc voltage.

That is, the arc voltage e has a relationship as shown in FIG. 7 with the cutting speed V, and therefore it is lowered when the cutting speed V is raised and it is raised when the cutting speed V is lowered. Hence, even if the torch 10 is kept at the target standoff H0, a change in the cutting speed V will cause the error outputted from the error computing device 37 to be changed. Therefore, the torch 10 is deviated from the target standoff H0, causing the cut shape to deteriorate. Accordingly, the reference voltage computation setter 36 calculates voltage Δe, which must be corrected, of the arc voltage e0 obtained to correspond to the target standoff H0 from the graph shown in FIG. 7 and stored to correspond to the values of the thickness and the material of the workpiece 18 to be cut, the diameter of the nozzle 14, and the target standoff H0 with respect to the cutting speed V0, and calculates the reference voltage E0 as follows and outputs it to the error computing device 37:

$$E0 = e0 \pm \Delta e \quad (4)$$

That is, in a case where the cutting speed V has become lower than a reference, a value obtained by subtracting the raised voltage portion Δe from e0 outputted as the reference voltage E0. In a case where the cutting speed V has become higher than a reference, a value obtained by adding a reduced voltage portion Δe to e0 outputted as the reference voltage E0. However, if the cutting speed V exceeds 2 m/s, the correction quantity Δe becomes constant.

The correction of the reference voltage E0 with the cutting speed V can be performed in accordance with the following calculations:

when $0 < V \leq KV2$ $$E0 = e0 - KV1 \times (V - 1) \quad (5)$$

when $V > KV2$ $$E0 = e0 - KV1 \times (KV2 - 1) \quad (6)$$

where KV1 and KV2 are speed factors shown in FIG. 5.

The error computing device 37 calculates the error ΔE of the standoff signal EH outputted from the electrode consumption/standoff detector 34 with respect to the reference voltage E0 so as to output it to the correction quantity computing device 38. That is, in a case where the standoff of the torch 10 has become larger than the target standoff H0 and the standoff signal EH is larger than the reference voltage E0, the error computing device 37 outputs positive error +ΔE which corresponds to the level of the standoff signal EW. In the contrary case, it outputs negative error −ΔE.

The correction quantity computing device 38 outputs, to the control device 30, the correction voltage signal ΔEH for the purpose of rapidly restoring the torch 10 to the target standoff H0 to correspond to the supplied error ΔE in accordance with the graph shown in FIG. 1. When the control device 30 receives the correction voltage signal ΔEH, it calculates the vertical repositioning speed of the torch 10 and the quantity of the elevation of the torch 10, and drives the lifting device 32 so as to elevate the torch 10 so that the torch 10 is restored to the target standoff H0.

Since the speed of elevating the torch 10 is, as described above, increased in accordance with the error ΔE of the detected voltage e1 between the electrode 12 and the workpiece 18 to be cut with respect to the reference voltage E0, the torch 10 can be quickly restored to the target standoff H0 even if the torch 10 is deviated from the target standoff H0 so that the cutting operation can be performed satisfactorily. Furthermore, since a non-sensitive zone, which does not output the correction signal, is formed in a portion in which the error ΔE is small, unstable change of the torch 10 adjacent to the target standoff H0 can be prevented and therefore an excellent cut surface can be obtained. Furthermore, since the change of the arc voltage due to the consumption of the electrode 12 and the change of the arc voltage which has taken place in accordance with a change in the cutting speed are corrected, the cutting operation can be performed further satisfactorily. In addition, since the proportional factor for the change in the elevation of the torch 10 is reduced in the range in which the error ΔE is small, overshoot of the torch 10 can be prevented. As an alternative to the detected voltage e1 between the electrode 12 and the workpiece 18 to be cut, the detected voltage e2 between the nozzle 14 and the workpiece 18 to be cut can be utilized to control the target standoff H0.

Figure 8:
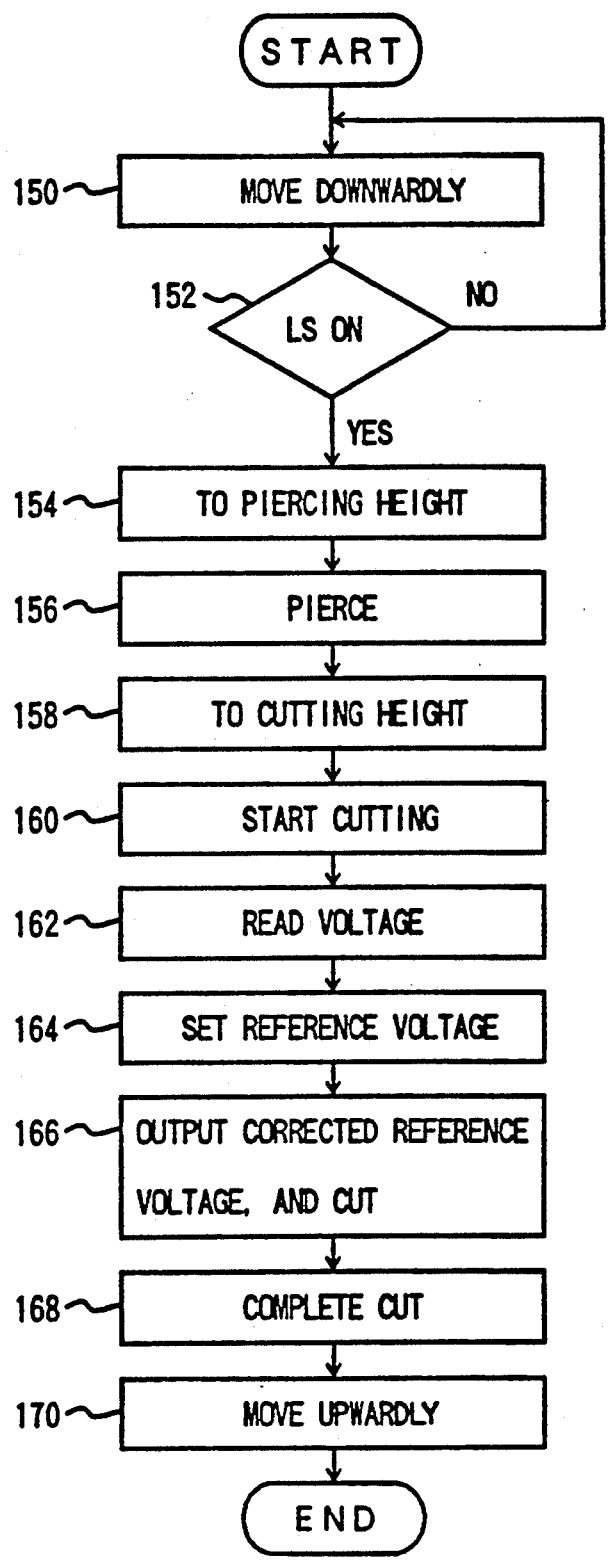
FIG. 8 is a flow chart which illustrates an applicable example relating to the second embodiment of the invention.

An applicable example of this embodiment will now be described with reference to a flow chart shown in FIG. 8. The application example is arranged in such a manner that the detected voltages e1 and e2 are also supplied to the reference voltage computation setter 36 of the standoff correction computing device 28 as designated by a dashed line shown in FIG. 3. The reference voltage computation setter 36 calculates the reference voltage E0 in accordance with the supplied detected voltages e1 and e2.

When a command to start cutting is supplied to the control device 30, it moves the torch 10 downwardly to a predetermined height from the workpiece 18 to be cut (step 150). When the torch has moved downwardly to reach the predetermined height, the control device 30 actuates a limit switch (omitted from illustration) (step 152) to indicate that the torch 10 has reached the predetermined height. Then, the control device 30 decreases the downward movement speed of the torch 10 so as to locate the torch at the piercing height (step 154), and then the piercing operation is performed (step 156). When the piercing operation has been completed, the control device 30 moves the torch 10 further downwardly so as to locate the torch at the target standoff H0 (step 158) and the cutting operation is commenced (160). The target standoff H0 varies depending upon the thickness and the material of the workpiece 18 to be cut, the diameter of the nozzle 14, and the like, and a value previously obtained from experiments or the like has been supplied to the control device 30 from the control panel or the like. When the torch 10 has been located at the target standoff H0 and the cutting operation has been commenced, the voltage detectors 24 and 26 detect the voltage at a predetermined time (for example, every 0.1 second) so as to supply the detected voltages e1 and e2 to the reference voltage computation setter 36 and the electrode consumption/standoff detector 34.

The reference voltage computation setter 36 reads the detected voltage e1 or e2 supplied from the voltage detectors 24 and 26 (step 162) so as to set the reference voltage E0 (step 164). In accordance with the progression of the cutting operation, the reference voltage computation setter 36 outputs the reference voltage E0, which has been corrected to correspond to a change in the cutting speed V to the error computing device 37 (step 166). On the other hand, the electrode consumption/standoff detector 34 outputs the standoff signal EH, which has been corrected to correspond to the consumption of the electrode 12 to the error computing device 37. Then, the cutting operation is performed similarly to the first embodiment. When the cutting operation has been completed (step 168), the torch 10 is moved upwardly (step 170) and the operation is completed. By making the arc voltage at the time of the commencement of the cutting operation to be the reference voltage E0 as described above, the influence of the consumption of the electrode can be eliminated and the reference voltage E0 can easily be set.

Although the transfer-arc-type plasma cutting machine has been described in the aforesaid embodiment, it can be a non-transfer-type cutting machine. Furthermore, the present invention can be adapted to a plasma welding machine. Although the graph possessed by the correction quantity computing device 38 was made to be point symmetrical with respect to the origin, the necessity of the point symmetric character can be eliminated. In particular, it is preferable to make the absolute value of −ΔE3 to be smaller than the absolute value of +ΔE3 so as to assuredly prevent the problem that the torch 10 comes in contact with the workpiece 18 to be cut. Furthermore, ΔE1, ΔE2, ΔE3, and the inclination of each line segment shown in FIG. 1 can be arbitrarily determined depending upon results of experiments.

A preferred embodiment of a standoff control method for a plasma cutting machine according to a third embodiment of the invention will now be described with reference to the drawings.

Figure 9:
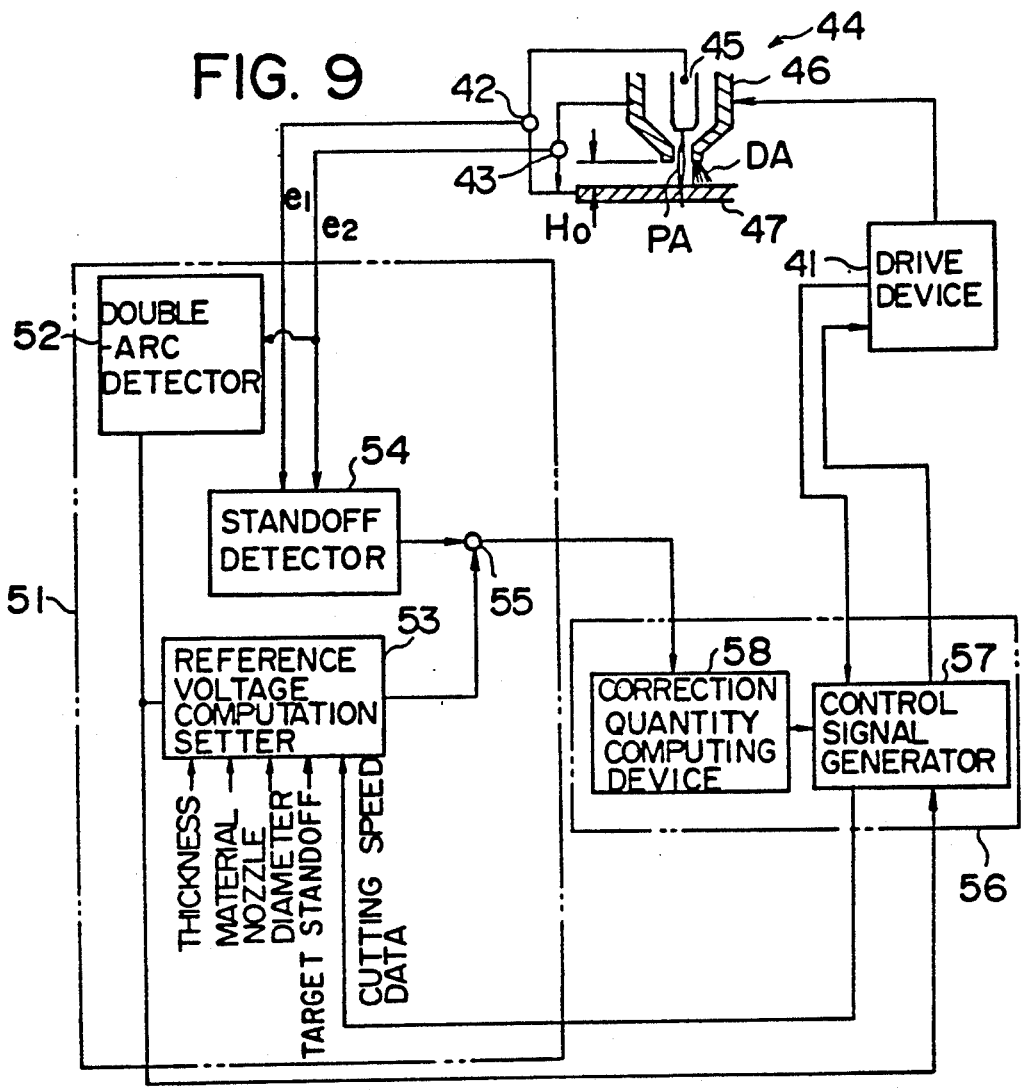
FIG. 9 is a block diagram which illustrates a plasma cutting machine according to a third embodiment of the invention.

Referring to FIG. 9, reference numeral 41 represents a drive device, 42 represents a voltage detector for detecting the voltage between the workpiece to be cut and the electrode, 43 represents a voltage detector for detecting the voltage between the workpiece to be cut and the nozzle, 45 represents an electrode, 46 represents a nozzle, 44 represents a torch composed of the electrode 45, the nozzle 46 and the like. Reference numeral 51 represents a standoff correction computing device for controlling the standoff of the torch 44, the standoff correction computing device 51 comprising a double-arc detector 52 for detecting the generation of double-arc DA in response to a signal supplied from the voltage detector 43, a reference voltage computation setter 53 for receiving a double-arc generation signal outputted from the double-arc detector 52, a standoff detector 54 for detecting an actual standoff in response to signals outputted from the voltage detectors 42 and 43 and an error computing device 55 for calculating a deviation between the reference voltage signal and an actual standoff signal. Reference numeral 56 represents a control device comprising a correction quantity computing device 58 for receiving the aforesaid deviation signal so as to output a standoff correction signal, and a control signal generator 57 for receiving the standoff correction signal so as to control the torch 44 to be maintained at the target standoff H0 and receiving data about the cutting speed of the torch 44 so as to calculate a deviation signal from the reference cutting speed V0 for the purpose of generating a drive control signal which controls the torch 44 to the reference cutting speed V0.

As a result of the structure thus arranged, when a plasma arc PA is generated by supplying the arc voltage between the workpiece 47 to be cut and the electrode 45 and when an operation gas and a shield gas are supplied between the electrode 45 and the nozzle 46, the workpiece 47 to be cut can be molded and cut with a plasma arc restricted by the shield gas and exhibiting a high current density. If the double-arc is not generated and the cutting operation is being performed normally, the signal outputted from the voltage detector 43 and received by the double-arc detector 52 is normal. Therefore, the actual standoff signal is, together with the signal outputted from the voltage detector 42, outputted to the error computing device 55 from the standoff detector 54. When the deviation signal between the reference voltage signal E0 calculated by the reference voltage computation setter 53 in accordance with the thickness, the material, the diameter of the nozzle, the target standoff, the cutting speed and the like and the aforesaid actual standoff signal is supplied to the correction quantity computing device 58, a standoff signal, which causes the error signal to be zero, is outputted to the control signal generator 57. Simultaneously, control is performed in such a manner that the cutting speed becomes the reference cutting speed V0.

Figure 10:
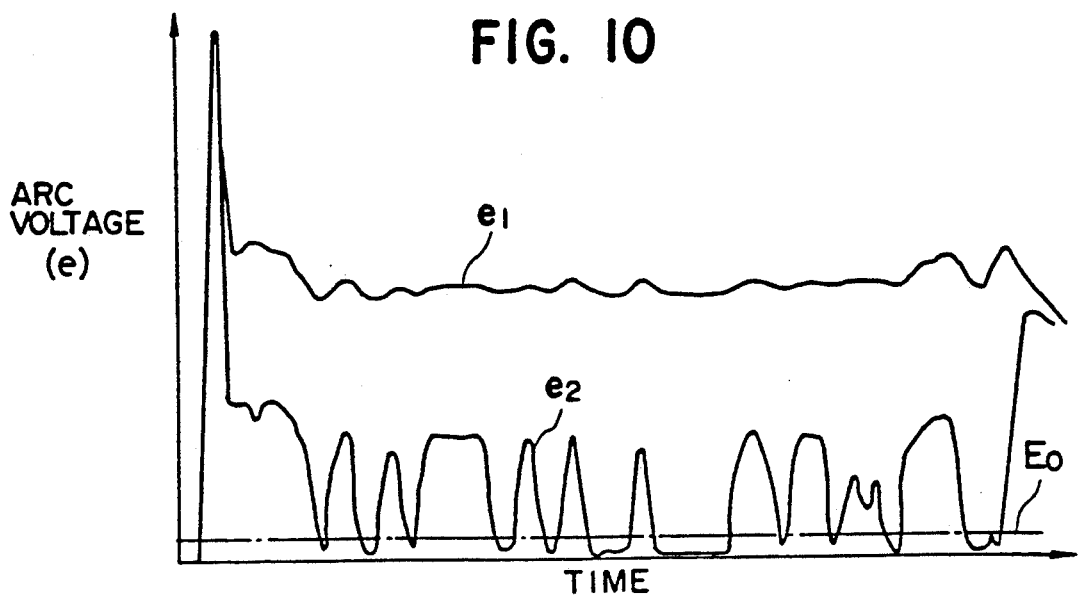
FIG. 10 is a graph which illustrates the change of the arc voltage to be outputted by a voltage detector.

If a portion of the nozzle 46 has been brought to a low impedance and the double-arc DA has been generated between the workpiece 47 to be cut and the nozzle 46 in addition to the plasma arc during the cutting operation, the arc voltage is considerably lowered as shown in FIG. 10. If it has become lower than the reference voltage E0, the double arc signal is supplied from the double-arc detector 52 to the reference voltage setting-/computing device 53 and the control signal generator 57 so that the target standoff H0 is modified to a value at which the double arc disappears. Furthermore, the control signal generator 57 is controlled in such a manner that the cutting speed is lowered to correspond to the degree at which the current density of the plasma arc has been lowered due to the modification of the target standoff H0. The cutting operation is continued for a predetermined time under the aforesaid safety control, and when the double-arc has disappeared, the normal torch control to be performed before the double-arc was generated is restored. If the double-arc is generated even after the control has been restored to the normal torch control, the control is performed in such a manner that the control is again restored to the safety control. Since the operation is, as described above, temporarily stopped if the double-arc has been generated, the process for again moving the torch can be eliminated. Therefore the working efficiency can be improved.

A preferred version of a standoff control method for the plasma cutting machine according to a fourth embodiment of the invention will now be described in detail with reference to the drawings.

Figure 11:
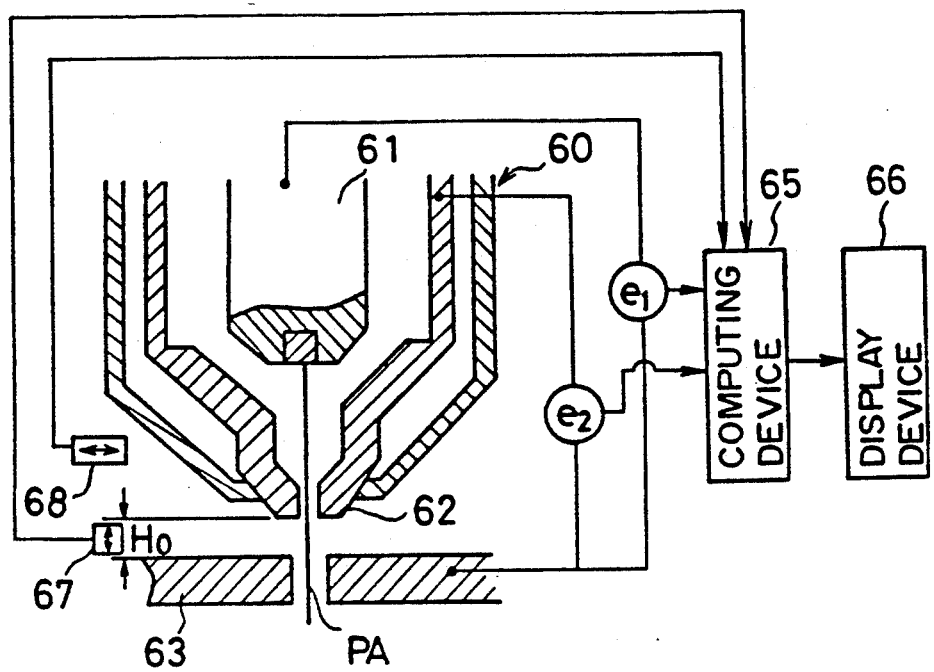
FIG. 11 is a view which illustrates a plasma cutting machine according to a fourth embodiment of the invention.

Referring to FIG. 11, a torch 60 of the plasma cutting machine is arranged in such a manner that a plasma arc PA generated between an electrode 61 and a workpiece 63 to be cut is contracted by a nozzle 62 and it is jetted from the nozzle 62 with an operation gas introduced to surround the nozzle 62 so that a high density plasma arc PA capable of melting, splashing and cutting the material is obtained. The relative position between the electrode 61 and the nozzle 62 is so fixed that the distance between the leading portion of the electrode 61 and the nozzle 62 and that between the electrode 61 and the workpiece 63 to be cut are lengthened with the consumption of the electrode 61, causing the arc voltage to be increased accordingly. Therefore, the voltage e1 between the electrode 61 and the workpiece 63 to be cut and the voltage e2 between the nozzle 62 and the workpiece 63 to be cut are measured. The aforesaid voltages e1 and e2 are supplied to a computing device 65 comprising a computer so that the number of uses of the electrode is calculated and the consumption quantity of the electrode is displayed on a display device 66. The target standoff H0 is inputted before the commencement of the cutting work or it can be measured by a known position sensor 67 so as to be fed back to the computing device 65. Furthermore, the cutting speed V is similarly inputted before the commencement of the cutting work or it can be measured by a known speed sensor 68 so as to be fed back to the computing device 65.

Figure 12:
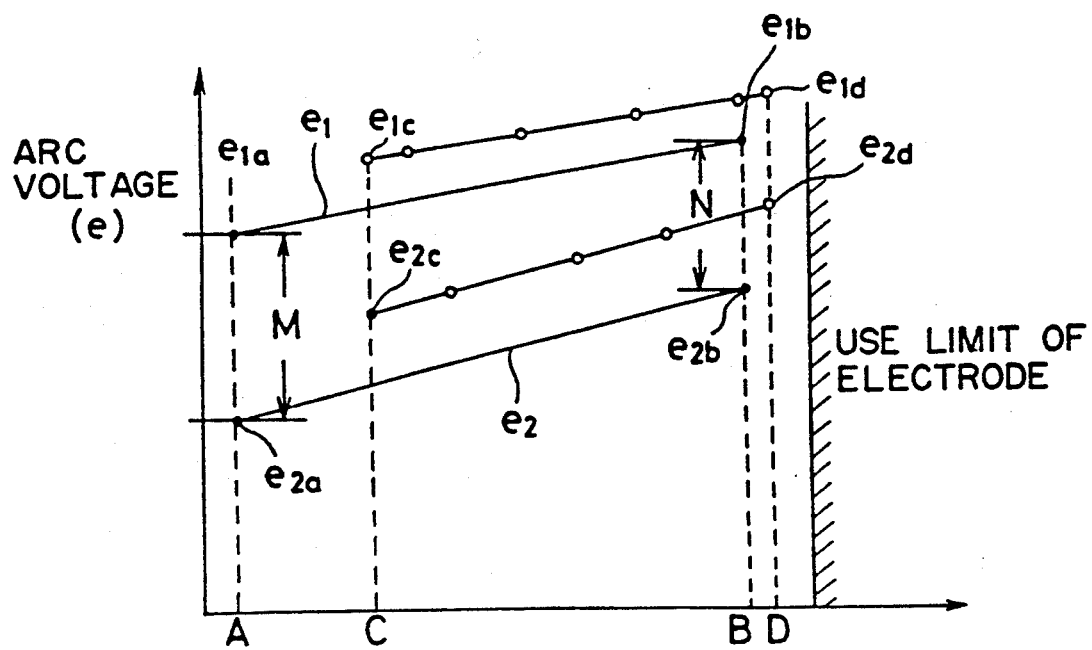
FIG. 12 is a graph which illustrates the relationship between the number of uses of the electrodes and the arc voltage.

In the structure thus arranged, the workpiece is cut under the following conditions, resulting in the values as shown in FIG. 12:

Cutting Condition 1

The diameter of contraction of nozzle 62: 0.5 mm
Electric current between electrode and workpiece to be cut: 14 amperes
Cutting speed: 1000 mm/min
Thickness: 2.3 mm
Standoff: 1.0 mm
Number of uses of electrodes: 1000 times
Voltage at initial stage of cutting operation (point A):
e1a=103 volts
e2a=52 volts
Voltage after cutting operations have been performed 1000 times (point B):
e1b=112 volts
e2b=68 volts Cutting Condition 2 (standoff is changed at point C during the cutting operation performed under Condition 1)

Standoff: 2.5 mm
Voltage (point C) at initial stage of cutting operation:
e1c=113 volts
e2c=66 volts Cutting Condition 3 (voltage point D was measured after cutting operations have been performed 1000 times under Condition 2)

Standoff: 2.5 mm
Voltage (point D) after the cutting operations have been performed 1000 times:
e1d=118 volts
e2d=75 volts As a result, the initial difference M (M=e1a−e2a) between the voltage e1 between the electrode 61 and the workpiece to be cut And the voltage e2 between the nozzle and the workpiece to be cut is larger than the difference N (N=e1b−e2b) after the cutting operations have been performed 1000 times. Furthermore, the fact that the distance of the standoff is lengthened will cause the arc voltage to be higher, and also the arc voltage after the cutting operations have been performed 1000 times to be higher.

Considering the arc voltage to be divided into the electrode consumption component Ep and the standoff component Es, Equation (2): Ep=ae1+be2 and Equation (3): Es=a1e1+b1e2N according to the aforesaid first invention are held.

Figure 13:
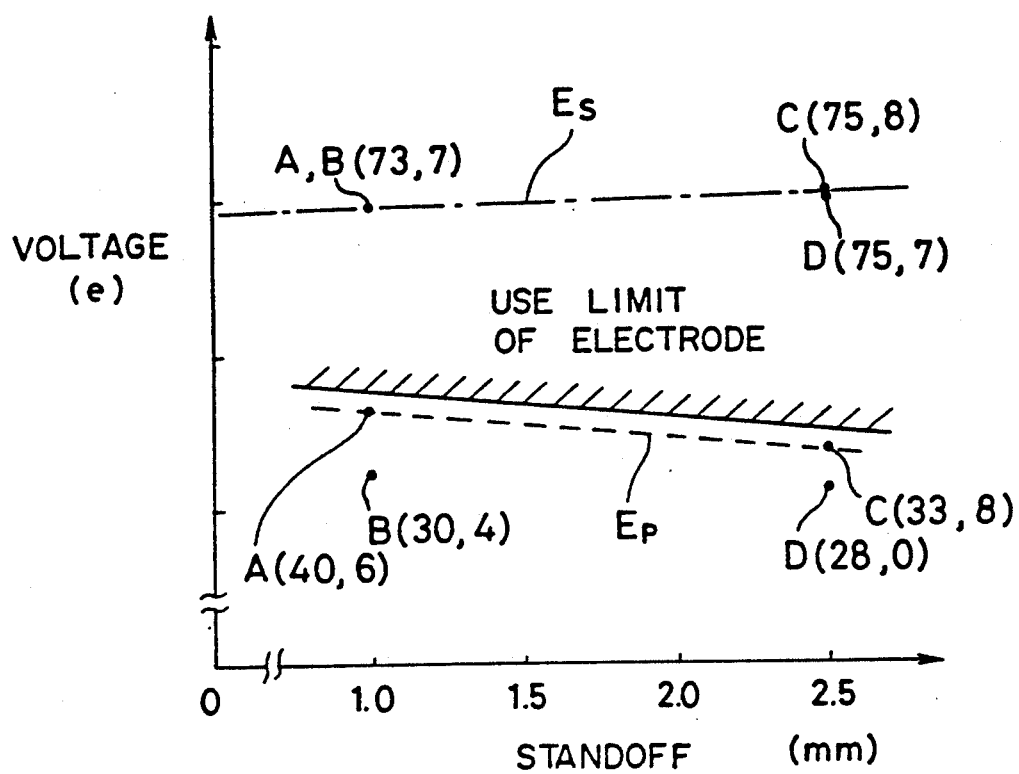
FIG. 13 is a graph which illustrates the relationship between the standoff and a standoff component voltage or an electrode consumption component voltage.

For example, when Ep and Es at each point (A, B, C and D) are obtained by using constants a=1.0, b=−1.2, a1=1.0 and b1=−0.563 obtained from experiments, the standoff component Es becomes substantially constant as shown in FIG. 13 and the electrode consumption component Ep becomes smaller than that at the initial stage. Hence, the predetermined value of the electrode consumption component Ep is set to be larger than the arc voltage which corresponds to the standoff. The consumption of the electrode can be detected in such a manner that the arc voltages e1 and e2 are measured after the standoff component Es has been adjusted and confirmed so as to calculate the electrode consumption component Ep from Equation (2).

Then, an applicable example of this embodiment will now be described.

The standoff is controlled to a constant value on the basis of the standoff component Es, the arc voltage e2 at this time is measured, and the arc voltage e0 with respect to the reference cutting speed V0 (assumed to be 1 m/minute) is calculated by using each factor shown in FIG. 5 in accordance with Equation (1): e0=[Ks1+Ks2×(H0+Kt)]×KN. The result of this calculation and the measured value are subjected to a comparison to obtain the use limit of the electrode depending upon a determination that the obtained value is included by a predetermined value range.

Figure 14:
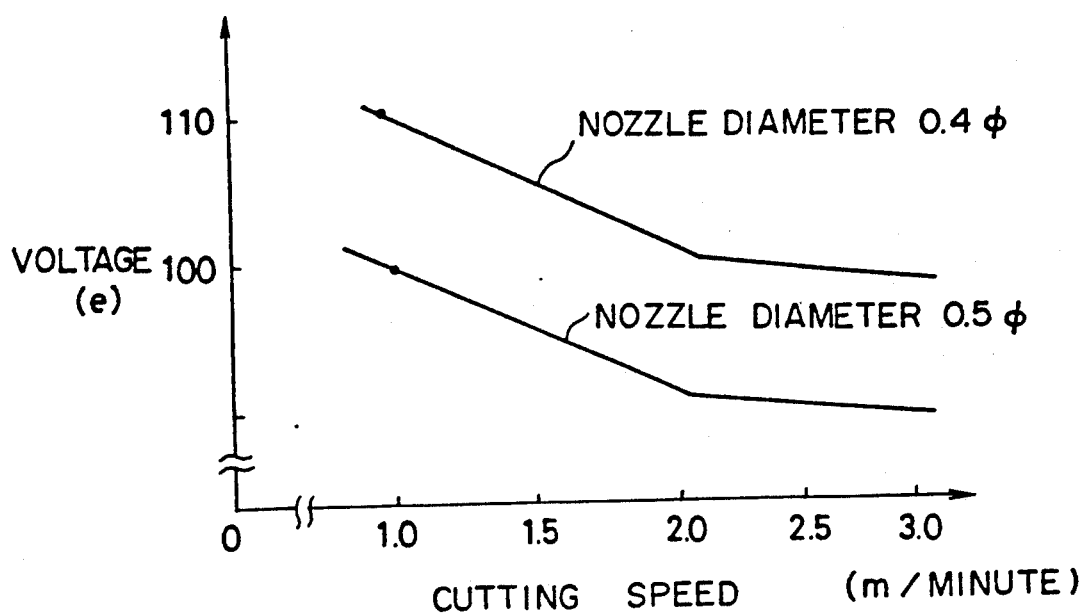
FIG. 14 is a graph which illustrates the relationship between the cutting speed and the arc voltage.

Since the cutting speed and the arc voltage hold a correlation as shown in FIG. 14, the reference voltage E0 corresponding to the cutting speed V at the subject time is calculated from Equation (5): E0=e0−KV1×(V−1) according to the aforesaid first embodiment of the invention when 0<V≦KV2 by using cutting speed factor KV. When KV2<V, it is similarly calculated by Equation (6): E0=e0−KV1×(KV2−1).

The aforesaid reference voltage E0 and the measured value of the arc voltage e1 are subjected to a comparison. If e1 becomes larger than the reference voltage E0, the fact that the electrode 61 has been consumed by a predetermined quantity is displayed on the display device 66. Therefore, the necessity of disassembling the nozzle so as to visually inspect it can be eliminated and therefore the operation can easily be performed. Furthermore, since the measurement can be always and continuously performed by observing the display device, the state of progress of the operation and the state of the electrode consumption can be contrasted with each other. Consequently, the moment at which the electrode must be changed can be detected even if the operation conditions change.

INDUSTRIAL APPLICABILITY

The present invention is effective to serve as a standoff control method and an apparatus for a plasma cutting machine or a welding machine capable of satisfactorily performing a cutting operation since the standoff between the torch and the workpiece to be cut can be maintained constant, capable of preventing deterioration of the working efficiency even if a double-arc is generated, and capable of properly detecting the use limit of the electrode even if the cutting conditions change.

What is claimed is:

1. In a standoff control method for a plasma cutting machine which detects the arc voltage between a workpiece to be cut and one of (a) an electrode of a torch and (b) a nozzle surrounding said electrode so as to control the standoff between said torch and said workpiece to be cut to a predetermined value in accordance with the detected voltage, said standoff control method for a plasma cutting machine comprising the steps of: detecting the voltage between said workpiece to be cut and one of (a) said electrode and (b) said nozzle so as to obtain a deviation with respect to a reference voltage, and varying the vertical repositioning speed of said torch in accordance with the degree of said deviation; the improvement comprising:
   linearly varying said vertical repositioning speed of said torch at a first rate in proportion to the degree of said deviation when said deviation exceeds a first predetermined value but is less than a second predetermined value; and
   linearly varying said vertical repositioning speed of said torch at a second rate in proportion to the degree of said deviation when said deviation exceeds said second predetermined value, said second rate being greater than said first rate.

2. A standoff control method for a plasma cutting machine according to claim 1, further comprising moving said torch upwardly at a third rate when said deviation exceeds a third predetermined value, said third predetermined value being greater than said second predetermined value, said third rate being greater than said second rate.

3. A standoff control method for a plasma cutting machine according to claim 1, further comprising maintaining said vertical repositioning speed of said torch at zero when said deviation is less than said first predetermined value.

4. A standoff control apparatus for a plasma cutting machine comprising:
   a voltage detector for detecting the arc voltage between a workpiece to be cut and one of (a) an electrode of a torch and (b) a nozzle surrounding said electrode,
   a standoff correction computing device for subjecting the thus detected voltage outputted from said voltage detector and a reference voltage to a comparison so as to output a standoff correction signal,
   wherein said standoff correction computing device has a reference voltage computation setter for outputting a reference voltage between said workpiece to be cut and said one of (a) said electrode and (b) said nozzle with respect to a predetermined standoff, an error computing device for calculating a deviation between said detected voltage and said reference voltage; and a correction quantity computing device for outputting a vertical repositioning speed signal of said torch in accordance with the degree of said evaluation;

wherein said standoff correction computing device has an electrode consumption/standoff detector which receives said detected voltage so as to output, to said error computing device, a standoff signal obtained by correcting for the degree of increase in the voltage due to the consumption of said electrode.

5. A standoff control apparatus for a plasma cutting machine according to claim 4, wherein said reference voltage computation setter outputs, as a reference voltage, a voltage obtained by adding the degree of change of said arc voltage, which has taken place due to the deviation of a cutting speed from a reference cutting speed, to an arc voltage determined in accordance with said reference cutting speed for said torch.

6. A standoff control apparatus for a plasma cutting machine according to claim 4, wherein said reference voltage computation setter receives said detected voltage and outputs, as said reference voltage, said supplied detected voltage when said torch has been disposed to a predetermined standoff position and the cutting operation has been commenced.

7. A standoff control apparatus for a plasma cutting machine according to claim 6, wherein said reference voltage computation setter outputs, as a reference voltage, a voltage obtained by adding the degree of change of said arc voltage, which has taken place due to the deviation of a cutting speed from a reference cutting speed, to an arc voltage determined in accordance with said reference cutting speed for said torch.

8. A standoff control apparatus for a plasma cutting machine comprising:

a voltage detector for detecting the arc voltage between a workpiece to be cut and one of (a) an electrode of a torch and (b) a nozzle surrounding said electrode, a standoff correction computing device for subjecting the thus detected voltage outputted from said voltage detector and a reference voltage to a comparison so as to output a standoff correction signal, wherein said standoff correction computing device has a reference voltage computation setter for outputting a reference voltage between said workpiece to be cut and said one of (a) said electrode and (b) said nozzle with respect to a predetermined standoff, an error computing device for calculating a deviation between said detected voltage and said reference voltage; and a correction quantity computing device for outputting a vertical repositioning speed signal of said torch in accordance with the degree of said deviation;

wherein said reference voltage computation setter outputs, as a reference voltage, a voltage obtained by adding the degree of change of said arc voltage, which has taken place due to the deviation of a cutting speed from a reference cutting speed, to an arc voltage determined in accordance with said reference cutting speed for said torch.

9. A standoff control apparatus for a plasma cutting machine according to claim 8, wherein said reference voltage computation setter receives said detected voltage and outputs, as said reference voltage, said supplied detected voltage when said torch has been disposed to a predetermined standoff position and the cutting operation has been commenced.

10. In a standoff control method for a plasma cutting machine in which the arc voltage between a workpiece to be cut and one of (a) an electrode of a torch and (b) a nozzle surrounding said electrode is detected so as to control the standoff between said torch and said workpiece to be cut to a predetermined value in accordance with the detected voltage, the improvement comprising the steps of:

detecting a voltage drop between said nozzle and said workpiece to be cut which is indicative of the generation of a double-arc during an operation of said torch;

continuing said operation of said torch under a safety control by positioning said torch away from said workpiece to be cut by a predetermined quantity until said double-arc disappears; and cancelling said safety control and making a restoration to a normal torch control after the voltage drop between said nozzle and said workpiece to be cut has been restored to an original level.

11. A standoff control method for a plasma cutting machine according to claim 10 wherein, if a voltage drop between said nozzle and said workpiece which is indicative of the generation of said double-arc has been detected, said step of continuing said operation of said torch comprises positioning said torch away from said workpiece to be cut by said predetermined quantity until said double-arc disappears and then continuing said operation under a said safety control in which the cutting speed of said torch is lowered.

12. In a standoff control method for a plasma cutting machine in which the arc voltage between a workpiece to be cut and one of (a) an electrode of a torch and (b) a nozzle surrounding said electrode is detected so as to control the standoff between said torch and said workpiece to be cut to a predetermined value in accordance with the detected voltage, the improvement comprising the steps of:

measuring the voltage between said electrode and said workpiece to be cut and the voltage between said nozzle and said workpiece to be cut, calculating an electrode consumption component voltage and a standoff component voltage from the thus measured voltages, and detecting the use limit of said electrode from said electrode consumption component voltage obtained at the time of controlling said standoff in such a manner that said standoff component voltage becomes substantially constant.

13. A standoff control method for a plasma cutting machine according to claim 12, wherein, when the voltage between said electrode and said workpiece to be cut and the voltage between said nozzle and said workpiece to be cut are measured so as to calculate an electrode consumption component voltage and a standoff component voltage from said measured voltages so as to control said standoff in such a manner that said standoff component voltage becomes substantially constant, an arc voltage value to be supplied at the time of the cutting operation is calculated from factors corresponding to cutting conditions and from an arc voltage to be generated at the time of a target standoff, and the use limit of said electrode is detected as a predetermined difference occurring in a comparison made between the thus calculated arc voltage value and a measured value.

* * * * *

UNITED STATES PATENT AND TRADEMARK OFFICE
CERTIFICATE OF CORRECTION

PATENT NO. : 5,326,955
DATED : July 5, 1994
INVENTOR(S) : Yozo NISHI et al

It is certified that error appears in the above-indentified patent and that said Letters Patent is hereby corrected as shown below:

Title page, Item [75], delete "Kurkawa" and insert
--Kurokawa--.

Column 15, line 3, delete "standoff." and insert
--standoff,--.

Column 15, lines 9-10, delete "evaluation;" and insert
--deviation;--.

Signed and Sealed this

Twentieth Day of September, 1994

Attest:

BRUCE LEHMAN

Attesting Officer     Commissioner of Patents and Trademarks